(12) United States Patent
Singh

(10) Patent No.: US 11,592,804 B2
(45) Date of Patent: Feb. 28, 2023

(54) TASK AUTOMATION BY SUPPORT ROBOTS FOR ROBOTIC PROCESS AUTOMATION (RPA)

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 330 days.

(21) Appl. No.: 17/070,206

(22) Filed: Oct. 14, 2020

(65) Prior Publication Data

US 2022/0113703 A1    Apr. 14, 2022

(51) Int. Cl.
| | |
|---|---|
| *B25J 9/16* | (2006.01) |
| *G06N 20/00* | (2019.01) |
| *G06Q 10/0631* | (2023.01) |
| *G06F 8/20* | (2018.01) |
| *G06F 9/48* | (2006.01) |
| *G05B 19/4155* | (2006.01) |

(52) U.S. Cl.
CPC .......... *G05B 19/4155* (2013.01); *B25J 9/163* (2013.01); *G06F 8/20* (2013.01); *G06F 9/48* (2013.01); *G06N 20/00* (2019.01); *G06Q 10/06316* (2013.01); *G05B 2219/50391* (2013.01)

(58) Field of Classification Search
None
See application file for complete search history.

(56) References Cited

U.S. PATENT DOCUMENTS

| | | | | |
|---|---|---|---|---|
| 9,555,544 | B2* | 1/2017 | Bataller | B25J 9/1679 |
| 10,307,906 | B2* | 6/2019 | Shah | G06Q 10/06 |
| 10,613,838 | B2 | 4/2020 | Kim et al. | |
| 10,802,889 | B1* | 10/2020 | Ganesan | G06F 9/5005 |
| 10,908,950 | B1* | 2/2021 | Dennis | G06F 9/4881 |
| 2018/0197123 | A1* | 7/2018 | Parimelazhagan | G06Q 10/0633 |
| 2019/0266254 | A1 | 8/2019 | Blumenfeld et al. | |
| 2019/0317803 | A1 | 10/2019 | Maheshwari et al. | |
| 2019/0324781 | A1 | 10/2019 | Ramamurthy et al. | |
| 2020/0219033 | A1 | 7/2020 | Smutko et al. | |
| 2020/0233707 | A1 | 7/2020 | Ramamurthy et al. | |

FOREIGN PATENT DOCUMENTS

| | | | |
|---|---|---|---|
| CN | 111680124 A | 9/2020 | |
| WO | 2020061697 A1 | 4/2020 | |
| WO | WO-2020061697 A1 * | 4/2020 | G06F 8/20 |

OTHER PUBLICATIONS

International Search Report & Written Opinion, dated Jan. 26, 2022, PCT Application No. PCT/US21/53497.

* cited by examiner

*Primary Examiner* — Isaac Tuku Tecklu
(74) *Attorney, Agent, or Firm* — LeonardPatel PC; Michael A. Leonard, II; Sheetal S. Patel

(57) ABSTRACT

Task automation by support robots for robotic process automation (RPA) is disclosed. RPA robots may be located on the computing systems of two or more users and/or remotely. The RPA robots may use an artificial intelligence (AI)/machine learning (ML) model that is trained to use computer vision (CV) to recognize tasks that the respective user is performing with the computing system. The RPA robots may then determine that the respective user is performing certain tasks on a regular basis in response to a certain action, such as receiving a request via email or another application, determining that a certain task has been completed, noting that a time period has elapsed, etc., and automate the respective tasks.

20 Claims, 8 Drawing Sheets

TASK AUTOMATION BY SUPPORT ROBOTS FOR ROBOTIC PROCESS AUTOMATION (RPA)

FIELD

The present invention generally relates to user interface (UI) automation, and more specifically, to task automation by support robots for robotic process automation (RPA).

BACKGROUND

Various communications and approvals are common in the workplace. For instance, an approval from a manager may be required before an employee can take a certain action, status reports may be sent periodically and/or after the completion of certain tasks, emails with certain content may be routinely sent, etc. Such correspondence may reduce employee productivity and/or delay certain actions. Accordingly, an improved approach may be beneficial.

SUMMARY

Certain embodiments of the present invention may provide solutions to the problems and needs in the art that have not yet been fully identified, appreciated, or solved by current UI automation technologies. For example, some embodiments of the present invention pertain to task automation by support robots for RPA.

In an embodiment, a system includes a server and a first user computing system including a first listener RPA robot. The first listener RPA robot is configured to monitor interactions of the first user with the first computing system and to provide data pertaining to the interactions of the first user to the server. The system also includes a second user computing system including a second listener RPA robot. The second listener RPA robot is configured to monitor interactions of the second user with the second computing system and to provide data pertaining to the interactions of the second user to the server. The server is configured to use an AI/ML model to determine, based on the data pertaining to the interactions of the first user and the second user, that the first user performs an initiating task and the second user performs a responsive task. The server is also configured to generate and deploy respective automations automating the initiating task on the first computing system and automating the responsive task on the second computing system.

In another embodiment, a computer-implemented method includes calling an AI/ML model configured to analyze data including interactions of users of a plurality of user computing systems and communications between at least a subset of the plurality of user computing systems, by a monitoring RPA robot. The computer-implemented method also includes determining based on the analysis by the AI/ML model, by the monitoring RPA robot, that when an initiating task is performed by one or more computing systems of the plurality of user computing systems, one or more responsive tasks are performed by one or more other user computing systems of the plurality of user computing systems. The computer-implemented method further includes generating and deploying, by the monitoring RPA robot, respective RPA robots implementing the initiating task and the one or more responsive tasks to the respective user computing systems.

In yet another embodiment, a non-transitory computer-readable medium stores a computer program. The computer program is configured to cause at least one processor to execute a monitoring RPA robot that calls an AI/ML model configured to analyze data including interactions of users of a plurality of user computing systems and communications between at least a subset of the plurality of user computing systems. The computer program is also configured to cause the at least one processor to determine based on the analysis by the AI/ML model, by the monitoring RPA robot, that when an initiating task is performed by one or more computing systems of the plurality of user computing systems, one or more responsive tasks are performed by one or more other user computing systems of the plurality of user computing systems. The computer program is further configured to cause the at least one processor to generate respective RPA workflows implementing the initiating task, the one or more responsive tasks, or both. The respective RPA workflows include activities that implement user interactions associated with the respective task.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
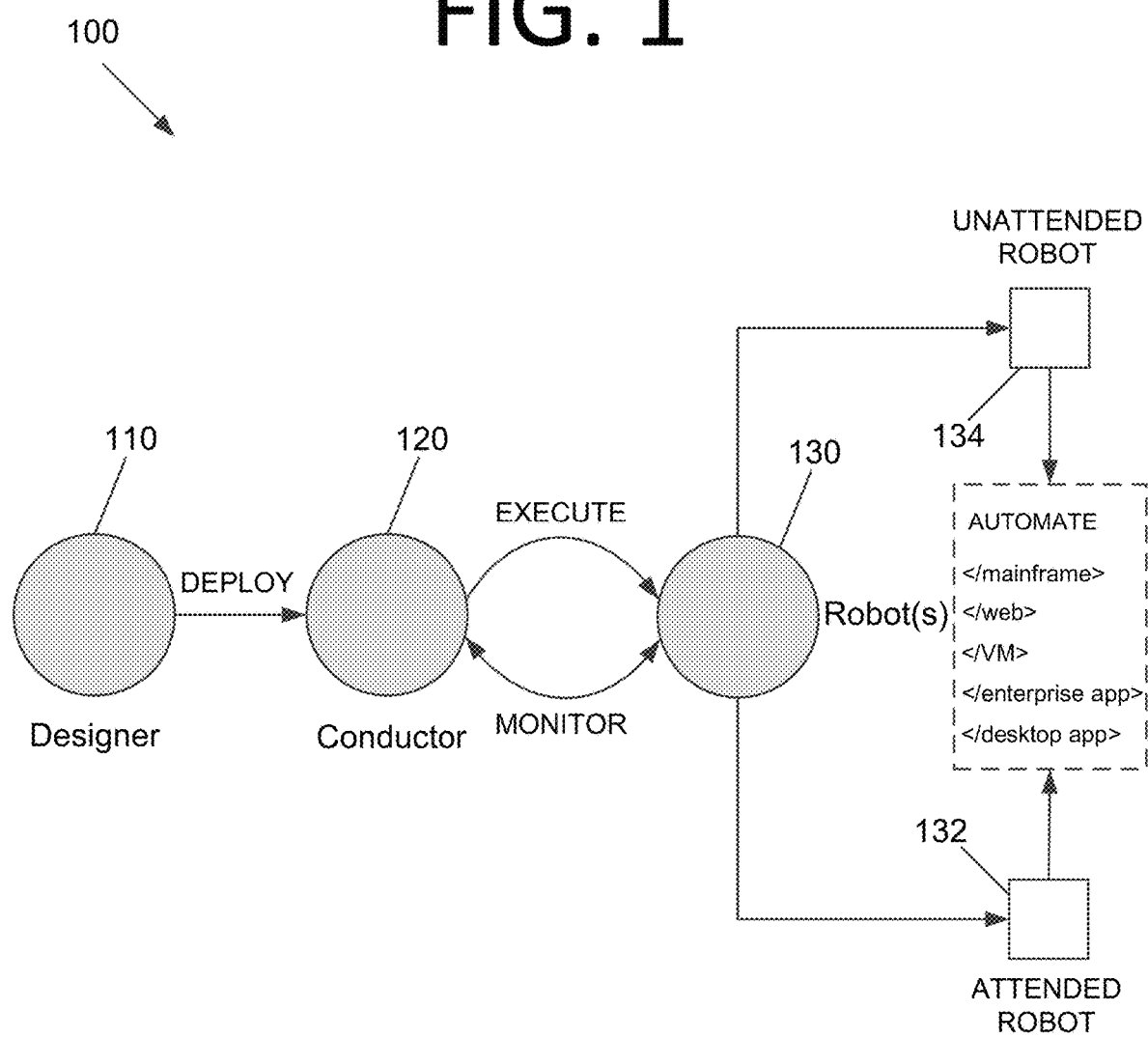
FIG. 1 is an architectural diagram illustrating a robotic process automation (RPA) system, according to an embodiment of the present invention.

Some embodiments pertain to task automation by support robots for RPA. RPA support robots may be located on the computing systems of two or more users and/or remotely (e.g., on a server). For instance, an RPA robot may be located on the computing system a manager and another RPA robot may be located on the computing system of an employee that reports to that manager. The RPA robots may use an artificial intelligence (AI)/machine learning (ML) model that is trained to use computer vision (CV) to recognize tasks that the user is performing with the computing system. The RPA robots may then determine that the user is performing certain tasks on a regular basis in response to a certain action, such as receiving a request via email or another application, determining that a certain task has been completed, noting that a time period has elapsed, etc.

After a task has been recognized, the RPA robot may make an automation suggestion to the user or an automation may be implemented automatically. For instance, the RPA robot may cause a popup window to appear informing the user that the RPA robot has noticed that the user sends an authorization request to his or her manager after receiving an invoice over a certain amount with certain content. If the user agrees that this automation would be beneficial, the robot may suggest a proposed action to the user, such as sending an email with content that tends to appear in the user's emails requesting authorization. The robot may then enter a training phase where the content to be sent is proposed to the user first. When the content is incorrect, the user may mark the portions of the content that are incorrect and an indication of the correct content. The AI/ML model may be retrained, or a replacement AI/ML model may be trained, as the corrections are provided, after a certain number of corrections are provided, after a certain period of time, etc. After a certain confidence is achieved, the RPA robot may automatically perform the action without user interaction.

In some embodiments, an RPA robot may monitor communications between two computing systems. For instance, an RPA robot may be located on a mail server system and may analyze emails that are sent back and forth between two employees. This may occur with or without supplemental content from the user computing systems, such as analysis of the user screens and what was occurring on each computing system when the email was sent or received. The server-side RPA robot may determine context that is not available to either RPA robot on the user computing systems alone and suggest actions to each robot to make the process more efficient. For instance, the server-side RPA robot may notice that certain content is routinely requested by a manager, intercept the email, and notify the RPA robot of the sender system that the information is missing and should be supplied.

In some embodiments, RPA robots or other listener/recorder processes may watch user interactions with respective computing systems. The listener/recorder processes may determine recurring user actions and the content. In some embodiments, the reasons for the user actions may also be determined. The recorder/listener process may then suggest an automation to the user or create the automation automatically (e.g., by creating an RPA workflow with activities associated with the actions, generating an RPA robot implementing the workflow, and deploying the RPA robot to the user's computing system).

In some embodiments, there may be a training phase where the recorder/listener process checks with the user before automating user actions and receives labeled training data to further train the AI/ML model. Alternatively, automatically generated RPA robots may be rolled out to a subset of users initially, potentially further train the AI/ML model during this phase. The RPA robot could then be rolled out to a broader group of user computing systems if the automation is successful/beneficial.

Consider the case where an AI/ML model initially learns to turn a light on at a certain time. However, as the days grow longer or shorter, the light may be turned on too early or too late, and the user may manually turn the light on or off to correct the error. The AI/ML model may learn that the action is being corrected, and search other available information to try to find a reason. For instance, the AI/ML model may determine that the time that the user wants the light to turn on and off generally corresponds to dusk and dawn, respectively, in that location on that given date based on information from a website with a sunrise/sunset table.

In some embodiments, it may be determined that such data and/or model drift is occurring for a previously successful AI/ML model. An RPA robot or other process may then return the AI/ML model to the training phase to retrain the model. Once accurate again, full automation may be re-enabled.

In some embodiments, RPA robots may be deployed on the server side in addition to or in lieu of RPA robots deployed on end user computing systems. The server-side RPA robot may see communications between multiple computing systems, such as noticing that when an email is sent from a first user to a second user, another related email is also sent from the second user to a third user. This may provide more context than robots deployed on end user computing systems can provide alone.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
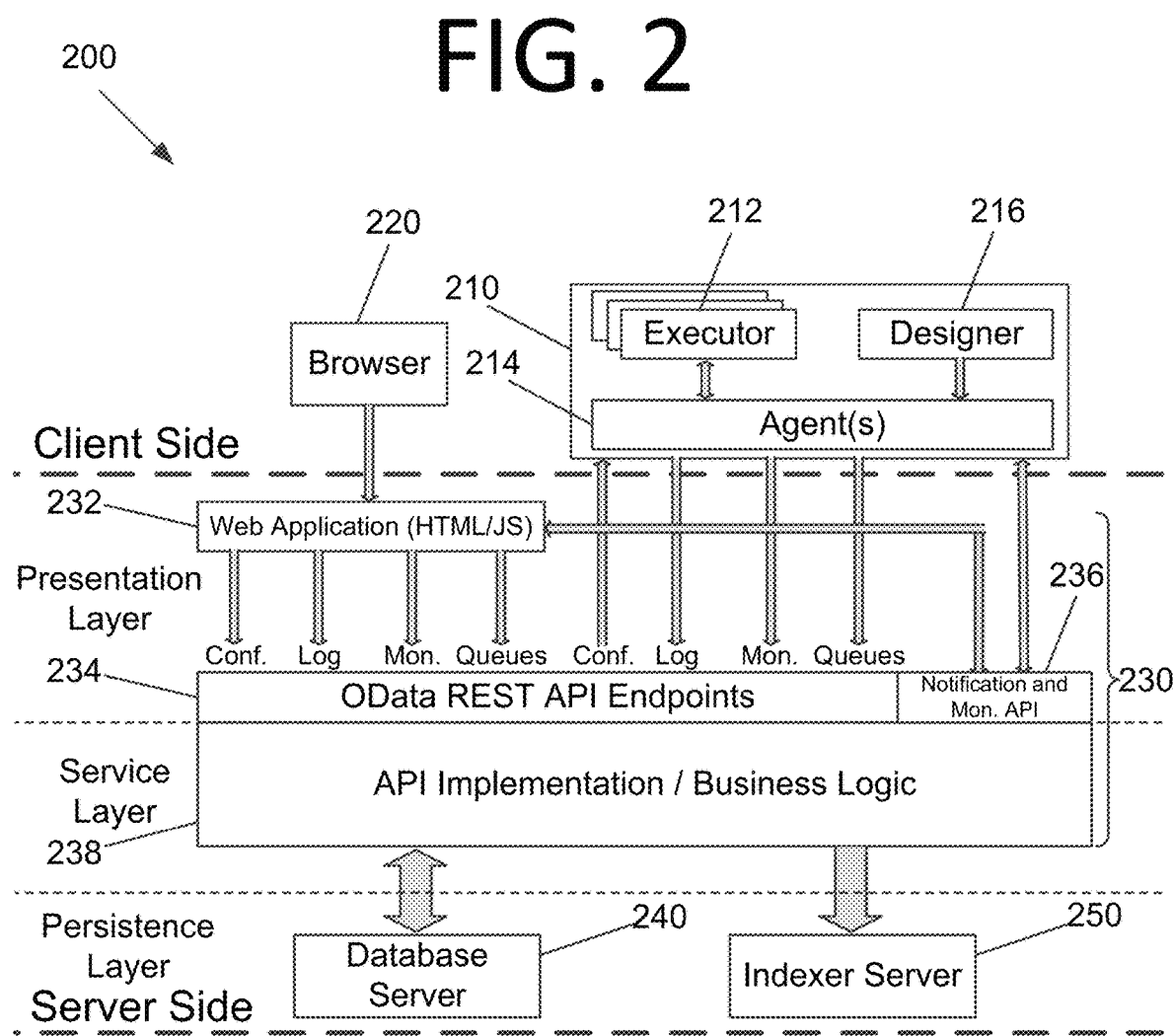
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
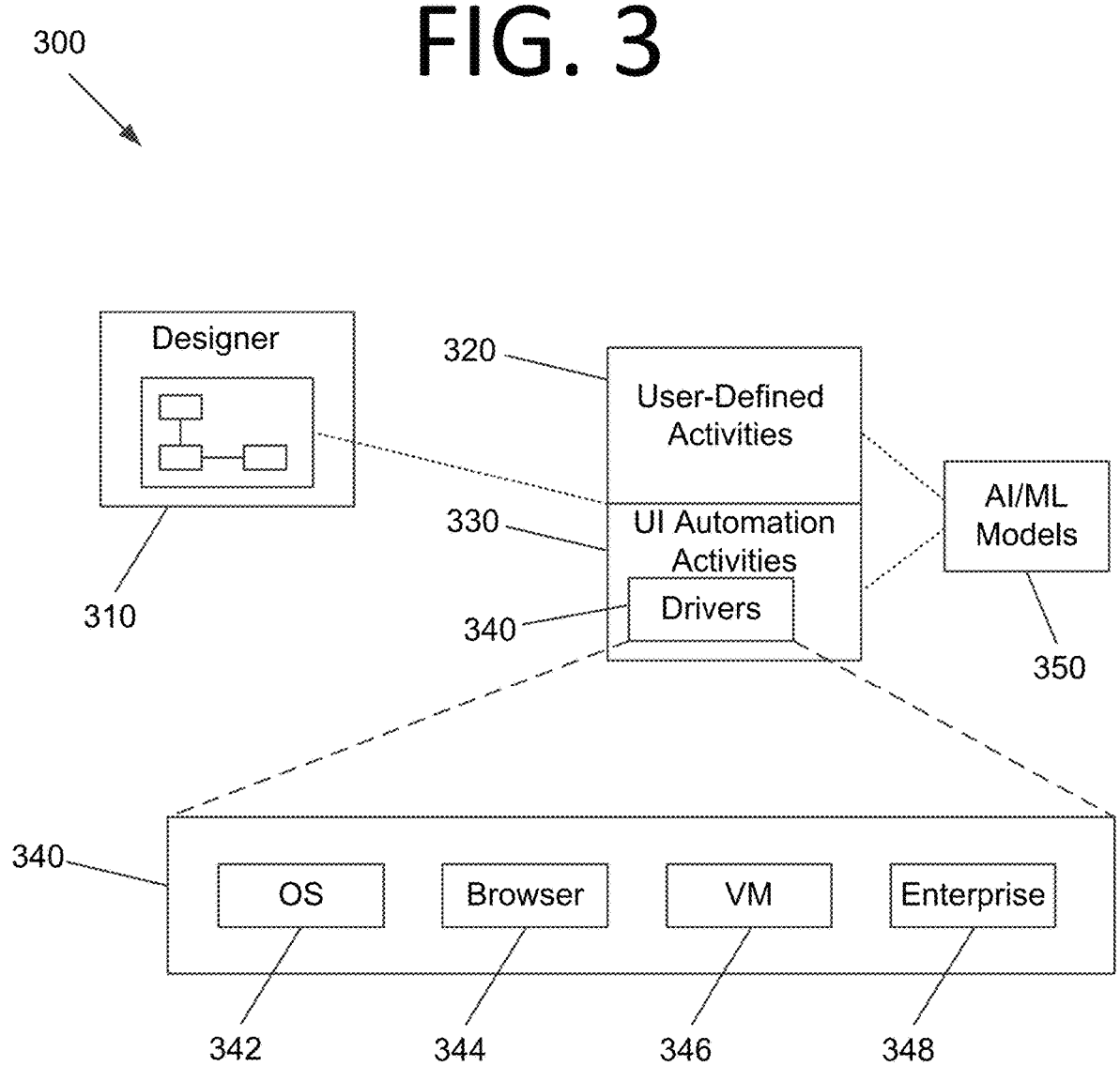
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
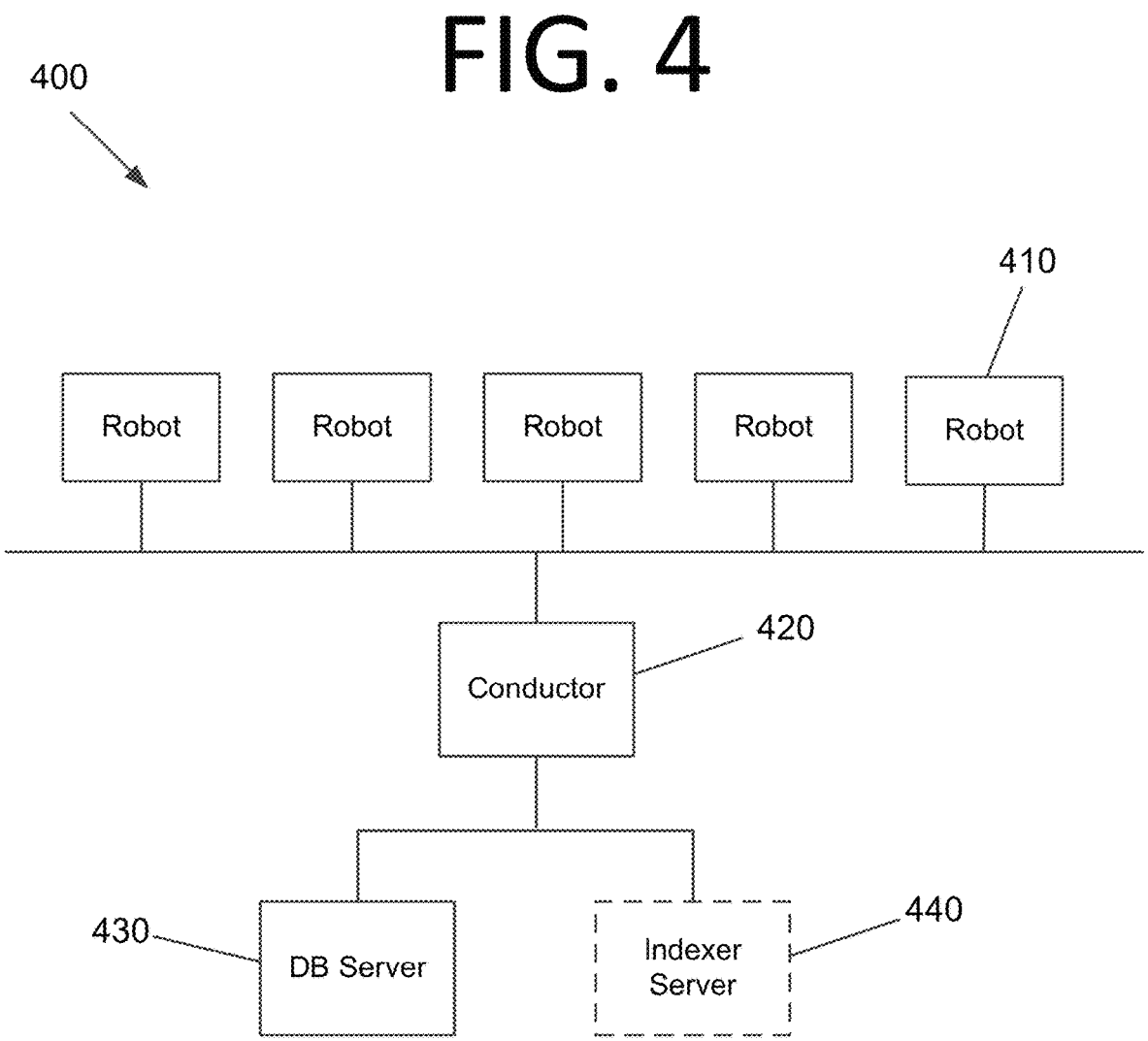
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
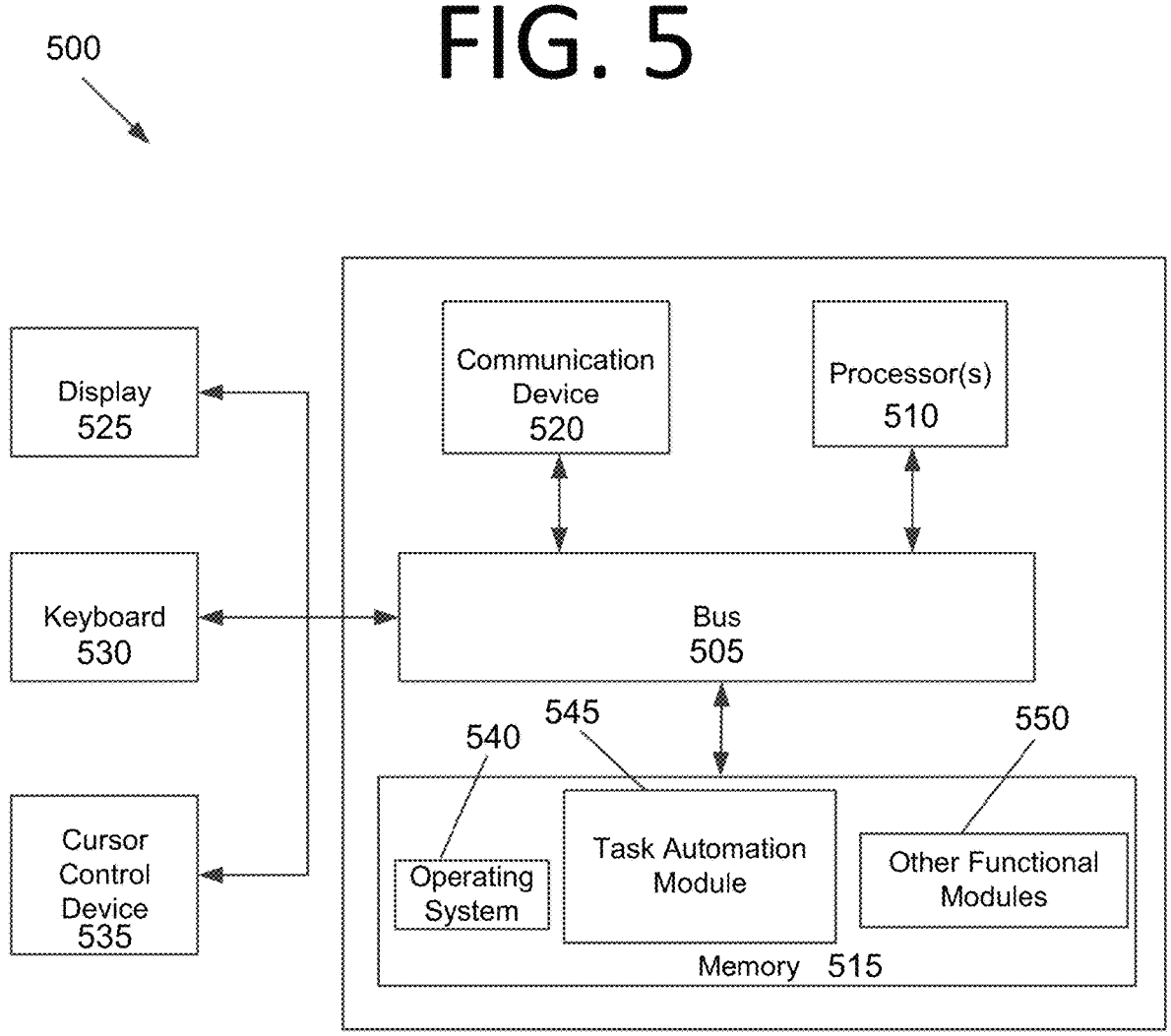
FIG. 5 is an architectural diagram illustrating a computing system configured to perform task automation by support robots for RPA, according to an embodiment of the present invention.

FIG. 5 is an architectural diagram illustrating a computing system 500 configured to perform task automation by support robots for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a task automation module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
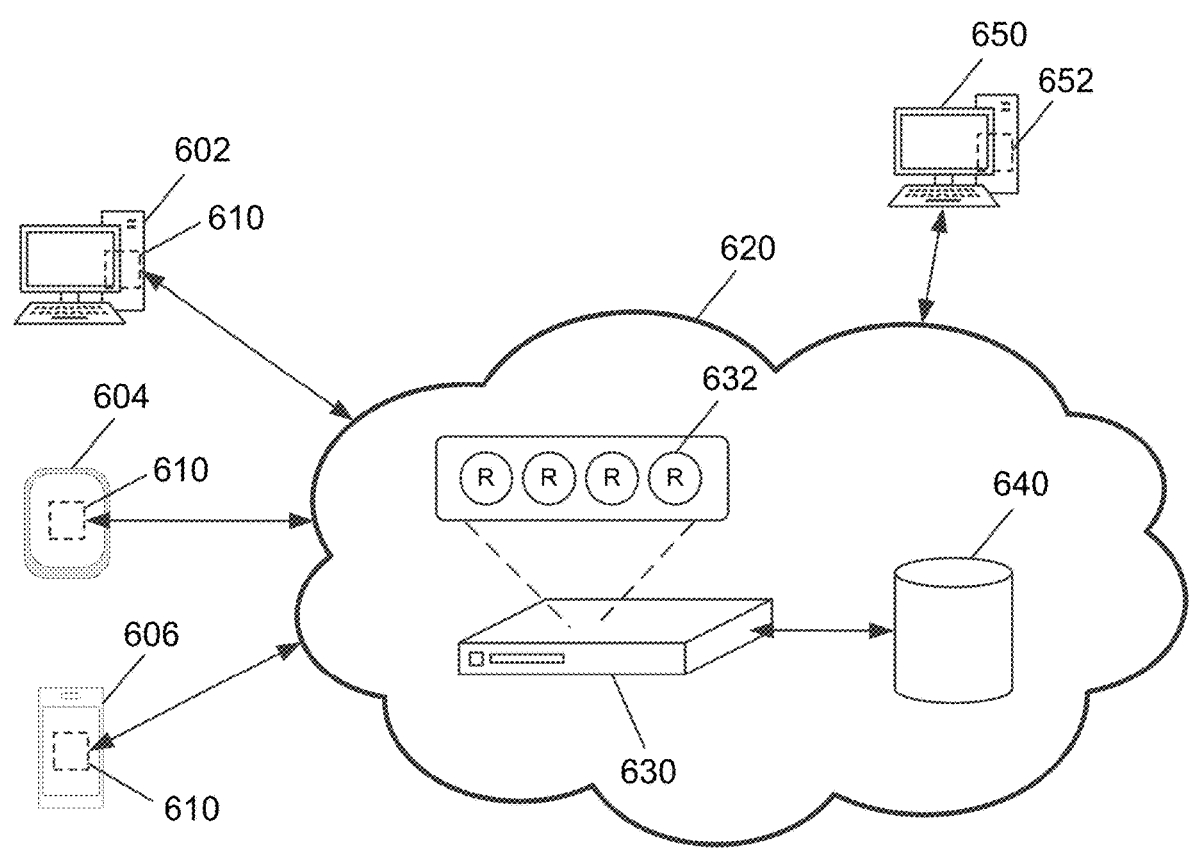
FIG. 6 is an architectural diagram illustrating a system configured to perform task automation by support robots for RPA, according to an embodiment of the present invention.

FIG. 6 is an architectural diagram illustrating a system 600 configured to perform task automation by support robots for RPA, according to an embodiment of the present invention. System 600 includes user computing systems, such as desktop computers 602, 603, tablet 604, and smart phone 606. However, any desired computing system may be used without deviating from the scope of invention including, but not limited to, smart watches, laptop computers, etc. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has an AI/ML-enabled RPA robot 610 that monitors the user's interactions with the computing system to determine commonly recurring tasks, their triggers, and their content. RPA robots 610 may use AI/ML models that are trained to use CV to recognize what the user is doing on the respective computing system. The RPA robots may then determine that the user is performing certain tasks on a regular basis in response to a certain action, such as receiving a request via email or another application, determining that a certain task has been completed, noting that a time period has elapsed, etc.

Computing systems 602, 604, 606 send information via a network 620 (e.g., a local area network (LAN), a mobile communications network, a satellite communications network, the Internet, any combination thereof, etc.) to a server 630, and then on to one another. In some embodiments, server 630 may be part of a public cloud architecture, a private cloud architecture, a hybrid cloud architecture, etc. In certain embodiments, server 630 may host multiple software-based servers on a single computing system. Server 630 includes AI-enabled RPA robots 632 in this embodiment that use AI/ML models to analyze communications between computing systems 602, 604, 606 via server 630 and provide information that local RPA robots 610 alone may not be able to determine.

Consider a board meeting example. One board member communicates with other board members, who then communicate with still other board members. RPA robots (e.g., RPA robots 610) or other processes deployed on end user computing systems 602, 604, 606 would not see this pattern. Server-side RPA robots 632, on the other hand, can see that one user sends an email, six other users react to that email, etc. Server-side RPA robot 632 may then learn to automate the entire process of sending the email from the first user and then sending the follow-on emails to the six other users.

Some such embodiments may be useful for governance/privacy purposes. Since RPA robot 632 resides on the server, data need not be shared with end users that should not receive it. From the end users' perspectives, they may not know why the system starts to suggest what it does, or automatically automates something.

After a given task has been recognized by RPA robots 610, RPA robots 610 make an automation suggestion to the user of the respective computing system in some embodiments. For instance, RPA robots 610 may cause a popup window to appear proposing the automation to the user. If the respective user agrees that this automation would be beneficial, RPA robots 610 may suggest a proposed action to the user. RPA robots 610 may then enter a training phase where the content to be sent is proposed to the user first. When the content is incorrect, the user may mark the portions of the content that are incorrect and provide an indication of the correct content. This information may be sent to server 630 and stored in a database 640 for review by an application 652 of a training computing system 650 that can be controlled to cause the respective AI/ML model to be retrained using the training data. After a certain confidence is achieved, RPA robots 610 may automatically perform the actions without user interaction using the trained AI/ML model. However, in certain embodiments, the automation may be deployed to user computing systems 602, 604, 606 automatically, potentially without the user's knowledge.

In some embodiments, the AI/ML models that are called by server-side RPA robots 632 and/or client-side RPA robots 610 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

Figure 7:
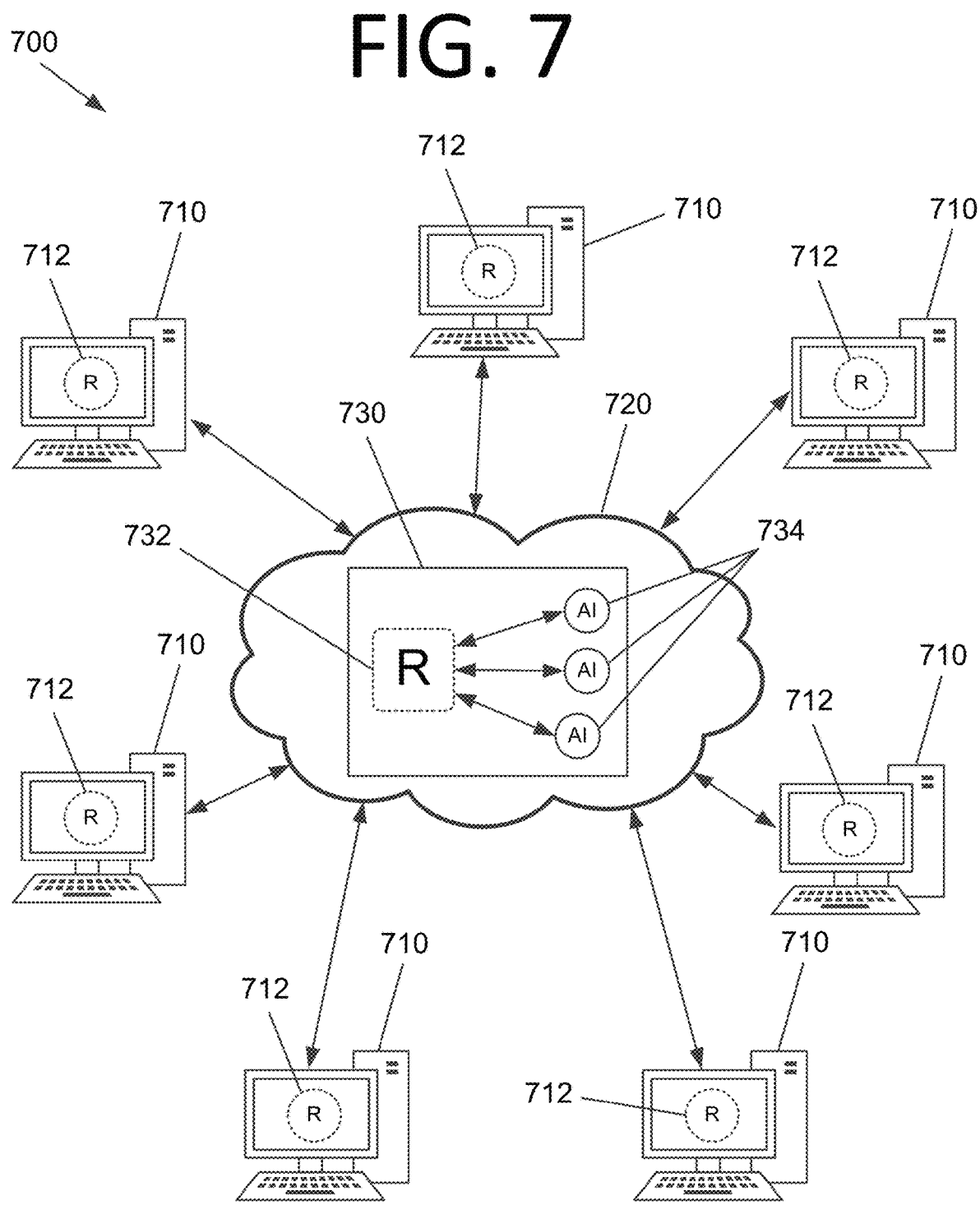
FIG. 7 is an architectural diagram illustrating a system configured to monitor communications between computing systems and perform task automation by RPA robots, according to an embodiment of the present invention.

FIG. 7 is an architectural diagram illustrating a system 700 configured to monitor communications between computing systems 710 and perform task automation by RPA robots 712, according to an embodiment of the present invention. In some embodiments, system 700 may be, or be implemented in, system 600 of FIG. 6. System 700 includes user computing systems 710 that have one or more RPA robots 712 running thereon. In some embodiments, computing systems 710 may be or include computing system 500 of FIG. 5. RPA robots 712 may include AI/ML-enabled RPA robots that call one or more AI/ML models, robots that have been deployed to perform process automation, listener robots that monitor the user's interactions with respective computing system 710, and/or any other type(s) of robots without deviating from the scope of the invention. Also, any number of robots 712 of the same type or multiple types may run on computing systems 710 without deviating from the scope of the invention.

Computing systems 710 send information via a network 720 (e.g., a local area network (LAN), a mobile communications network, a satellite communications network, the Internet, any combination thereof, etc.) to a server 730 or some other computing system in network 720, and then on to one another. In some embodiments, server 730 may be part of a public cloud architecture, a private cloud architecture, a hybrid cloud architecture, etc. Indeed, server 730 may be implemented partially or entirely in software in some embodiments, and may represent multiple software and/or hardware systems. In certain embodiments, server 730 may host multiple software-based servers on a single computing system.

Server 730 includes an AI-enabled RPA robot 732 in this embodiment that use AI/ML models 734 to analyze communications between computing systems 710 and provide information that local RPA robots 712 and/or computing systems 710 alone may not be able to determine. In some embodiments, one or more of AI/ML models 734 may be located on and called from a different server or other computing system. AI-enabled RPA robot 732 determines patterns in the communications, such as that when one user sends an email with certain content, submits a certain web form, enters data or submits a request in a certain application, etc., one or more other users take an action responsive thereto, such as providing an approval, sending a request to another user, etc. AI-enabled RPA robot 732 may then suggest an automation to the respective user for their respective task, or may automatically generate one or more RPA workflows including activities that correspond to the user interactions with respective computing system 710 associated with the action, generate respective RPA robots 712, and then deploy RPA robots 712 to appropriate computing systems 710. The overall chain of tasks performed by the users may then be automated. Also, privacy concerns may be addressed since information that a given user should not have access to need not be provided. For instance, a user may not see that another RPA robot has been deployed to another user computing system that receives an annual review from the user and then facilitates a commenting and performance review process by that user's superiors.

In some embodiments, deployed RPA robots 712 that were deployed, caused to be deployed, or otherwise facilitated by AI-enabled RPA robot 732 initially enter a training phase where actions to be taken by RPA robot 712 is first proposed to the user. When the content is incorrect, the user may mark the portions of the content that are incorrect and provide an indication of the correct content via an application on respective user computing system 710. This information may be sent to server 730 or some other server and stored in a database (e.g., similar to database 640 of FIG. 6) for subsequent review and training of an AI/ML model.

Figure 8:
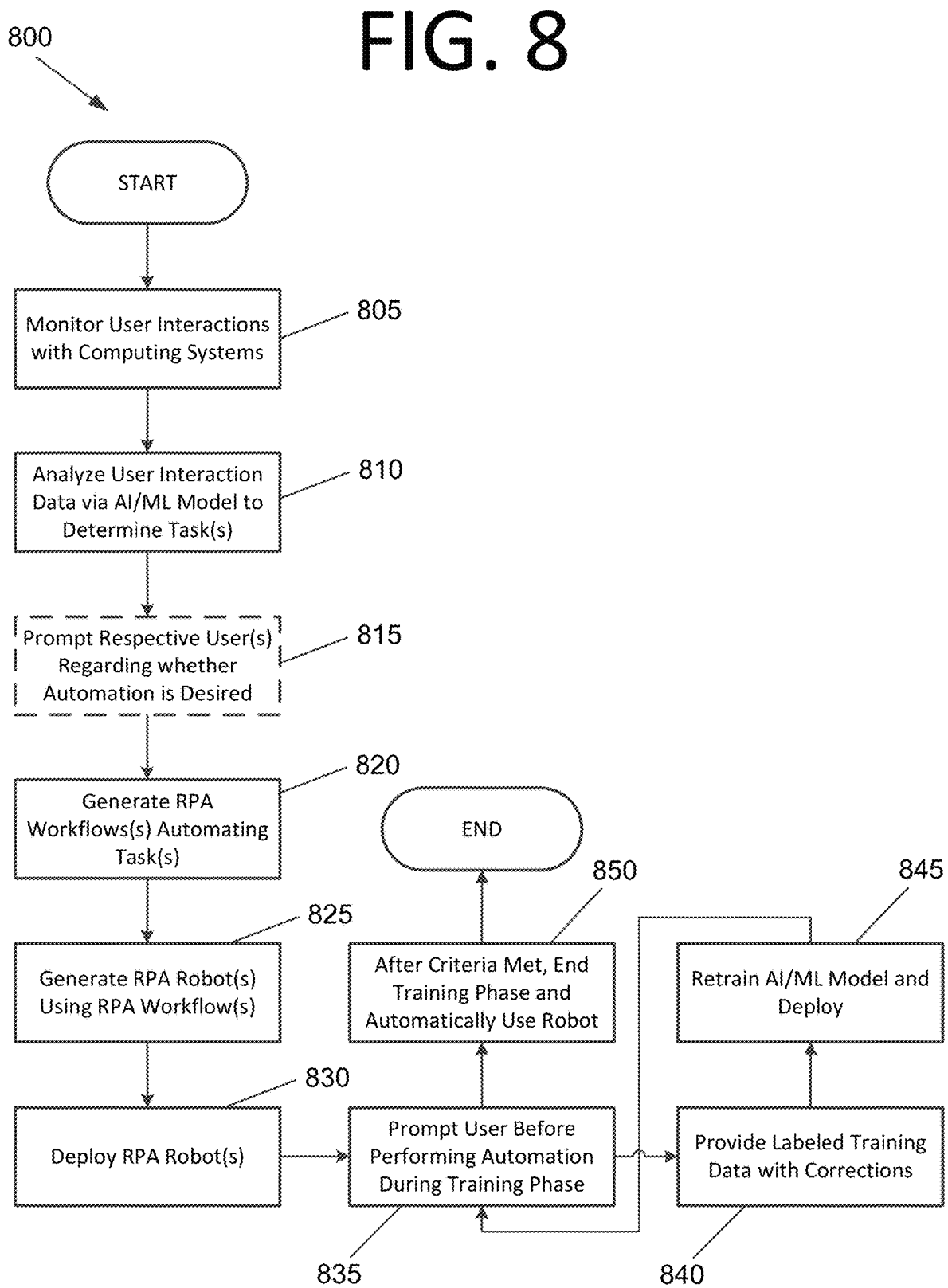
FIG. 8 is a flowchart illustrating a process for performing task automation by support robots for RPA, according to an embodiment of the present invention.

FIG. 8 is a flowchart illustrating a process 800 for performing task automation by support robots for RPA, according to an embodiment of the present invention. The process begins with monitoring interactions of users with their computing systems at 805. In some embodiments, the monitoring may be performed by listener RPA robots, which may generate data including the user interactions. An AI/ML model is used to analyze data including the user interactions and determine tasks that the users perform at 810. For instance, the AI/ML model may determine that when one user performs an initiating task, another user performs a responsive task. In some embodiments, it may be determined by the AI/ML model or a calling RPA robot that a computing system carrying out the responsive task communicates with another computing system besides the one that performed the initiating task, for example, and uses this information to perform the responsive task. In certain embodiments, the data pertaining to the interactions of users are not shared with computing systems of other users.

In some embodiments, the user of the respective computing system is asked whether automation of the respective task is desired at 815. However, in certain embodiments, this step may not be employed. If the user indicates that the automation is desired at 815, or potentially automatically without user input, RPA workflow(s) implementing the respective task(s) (e.g., the initiating task and the responsive task) are generated at 820. The RPA workflow(s) may include activities that implement the user interactions associated with the respective task. RPA robot(s) are then generated at 825 using the RPA workflow(s), and the RPA robot(s) are deployed at 830.

In some embodiments, the deployed RPA robot(s) enter a training phase after initial deployment. However, in certain embodiments, this training phase may be skipped or otherwise not used. The user of the respective computing system may be prompted by the deployed RPA robot at 835 regarding whether to automatically perform the task, and the user may be provided with the proposed action(s) in some embodiments. If the RPA robot does not carry out the task correctly, the user may mark portions of the content that are incorrect and provide one or more indications of correct content as labeled training data at 840. At some point after receiving this training data (e.g., after an amount of time has passed, after an amount of training data is received, etc.), an AI/ML model called by the RPA robot is retrained, and/or the RPA robot itself is modified or replaced and a replacement RPA robot is deployed, at 845. After certain criteria are met (e.g., after an amount of time passes without receiving corrections, less than a threshold amount of corrections in a period of time is received, etc.), the training phase may be ended at 850 and the RPA robot(s) may be used automatically to perform the respective task.

The process steps performed in FIG. 8 may be performed by a computer program, encoding instructions for the processor(s) to perform at least part of the process(es) described in FIG. 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
   a server;
   a first user computing system comprising a first listener robotic process automation (RPA) robot, the first listener RPA robot configured to monitor interactions of a first user with the first computing system and to provide data pertaining to the interactions of the first user with the first computing system to the server; and
   a second user computing system comprising a second listener RPA robot, the second listener RPA robot configured to monitor interactions of a second user with the second computing system and to provide data pertaining to the interactions of the second user with the second computing system to the server, wherein
   the server is configured to:
      use an artificial intelligence (AI)/machine learning (ML) model to determine, based on the data pertaining to the interactions of the first user with the first computing system and the interactions of the second user with the second computing system, that the first user performs an initiating task on the first computing system and the second user performs a responsive task on the second computing system, and
      generate and deploy respective automations automating the initiating task on the first computing system and automating the responsive task on the second computing system.

2. The system of claim 1, wherein the automating of the initiating task of the first user on the first computing system, the automating of the responsive task of the second user on the second computing system, or both, comprises:
   generating a respective RPA workflow comprising activities that implement the user interactions associated with the respective task, by the server;
   generating a respective RPA robot that implement the respective RPA workflow, by the server; and
   deploying the generated RPA robot to the respective user computing system, by the server.

3. The system of claim 1, wherein prior to generating and deploying the respective automations that automate the initiating task on the first computing system and automate the responsive task on the second computing system, the respective computing systems are configured to suggest the respective automation to the respective user.

4. The system of claim 3, wherein when the respective user approves the respective automation, the respective automation enters a training phase where tasks to be performed by the respective automation are proposed to the respective user before carrying out the respective automation.

5. The system of claim 3, wherein when content proposed by the respective automation is incorrect, the respective user computing system is configured to:
receive one or more marked portions of the content that are incorrect and one or more indications of correct content;
send data comprising the received one or more marked portions of the content that are incorrect and the one or more indications of the correct content to the server; and
retrain the AI/ML model, by the server.

6. The system of claim 5, wherein after a period of time passes without corrections by the respective user, the AI/ML model obtains a certain confidence, or both, the deployed respective automation is configured to perform the respective task without input from the respective user.

7. The system of claim 1, wherein the server uses the AI/ML model via a server-side RPA robot.

8. The system of claim 7, wherein the server-side RPA robot is configured to monitor communications between the first computing system and the second computing system.

9. The system of claim 8, wherein the server-side RPA robot is configured to determine that the second user computing system communicates with a third computing system as part of the responsive task and uses information from the third computing system to perform the responsive task.

10. The system of claim 1, wherein the data pertaining to the interactions of the second user is not shared by the server with the first computing system, the data pertaining to the interactions of the first user is not shared by the server with the second computing system, or both.

11. The system of claim 1, wherein the respective automations automating the initiating task on the first computing system and the responsive task on the second computing system are deployed without informing the respective users of the first computing system and the second computing system.

12. A computer-implemented method, comprising:
calling an artificial intelligence (AI)/machine learning (ML) model configured to analyze data comprising interactions of users of a plurality of user computing systems and communications between at least a subset of the plurality of user computing systems, by a monitoring robotic process automation (RPA) robot;
determining based on the analysis by the AI/ML model, by the monitoring RPA robot, that when an initiating task is performed by one or more computing systems of the plurality of user computing systems, one or more responsive tasks are performed by one or more other user computing systems of the plurality of user computing systems; and
generating and deploying, by the monitoring RPA robot, respective RPA robots implementing the initiating task and the one or more responsive tasks to the respective user computing systems.

13. The computer-implemented method of claim 12, wherein the generating of the respective RPA robots implementing the initiating task and the one or more responsive tasks comprises:
generating a respective RPA workflow comprising activities that implement user interactions associated with the respective task, by the monitoring RPA robot.

14. The computer-implemented method of claim 12, wherein prior to generating and deploying the respective automations that automate the initiating task and the one or more responsive tasks, the monitoring RPA robot is configured to require approval by respective users of the respective computing systems.

15. The computer-implemented method of claim 14, wherein when the respective user approves the respective automation, the respective automation is deployed by the monitoring RPA robot in a training phase where tasks to be performed by the respective automation are proposed to the respective user before carrying out the respective automation.

16. The computer-implemented method of claim 15, wherein when content proposed by the respective automation is incorrect, the method further comprises:
using data comprising marked portions of content that are incorrect and indications of correct content from one or more of the plurality of user computing systems to retrain the AI/ML model or to cause the AI/ML model to be retrained, by the monitoring RPA robot.

17. The computer-implemented method of claim 16, wherein after a period of time passes without receiving corrections, after the AI/ML model obtains a certain confidence, or both, the deployed respective automations are configured to perform the respective tasks without input from the respective users.

18. The computer-implemented method of claim 12, wherein the data pertaining to user interactions is not shared by the monitoring RPA robot with the plurality of user computing systems.

19. A non-transitory computer-readable medium storing a computer program, the computer program configured to cause at least one processor to:
execute a monitoring robotic process automation (RPA) robot that calls an artificial intelligence (AI)/machine learning (ML) model configured to analyze data comprising interactions of users of a plurality of user computing systems and communications between at least a subset of the plurality of user computing systems;
determine based on the analysis by the AI/ML model, by the monitoring RPA robot, that when an initiating task is performed by one or more computing systems of the plurality of user computing systems, one or more responsive tasks are performed by one or more other user computing systems of the plurality of user computing systems; and
generate respective RPA workflows implementing the initiating task, the one or more responsive tasks, or both, wherein
the respective RPA workflows comprise activities that implement user interactions associated with the respective task.

20. The non-transitory computer-readable medium of claim 19, wherein computer program is configured not to share the data pertaining to user interactions with the plurality of user computing systems.

* * * * *